Nov. 15, 1927.  
J. L. PRICE  
DISK BRAKE  
Filed April 13, 1925
1,649,185
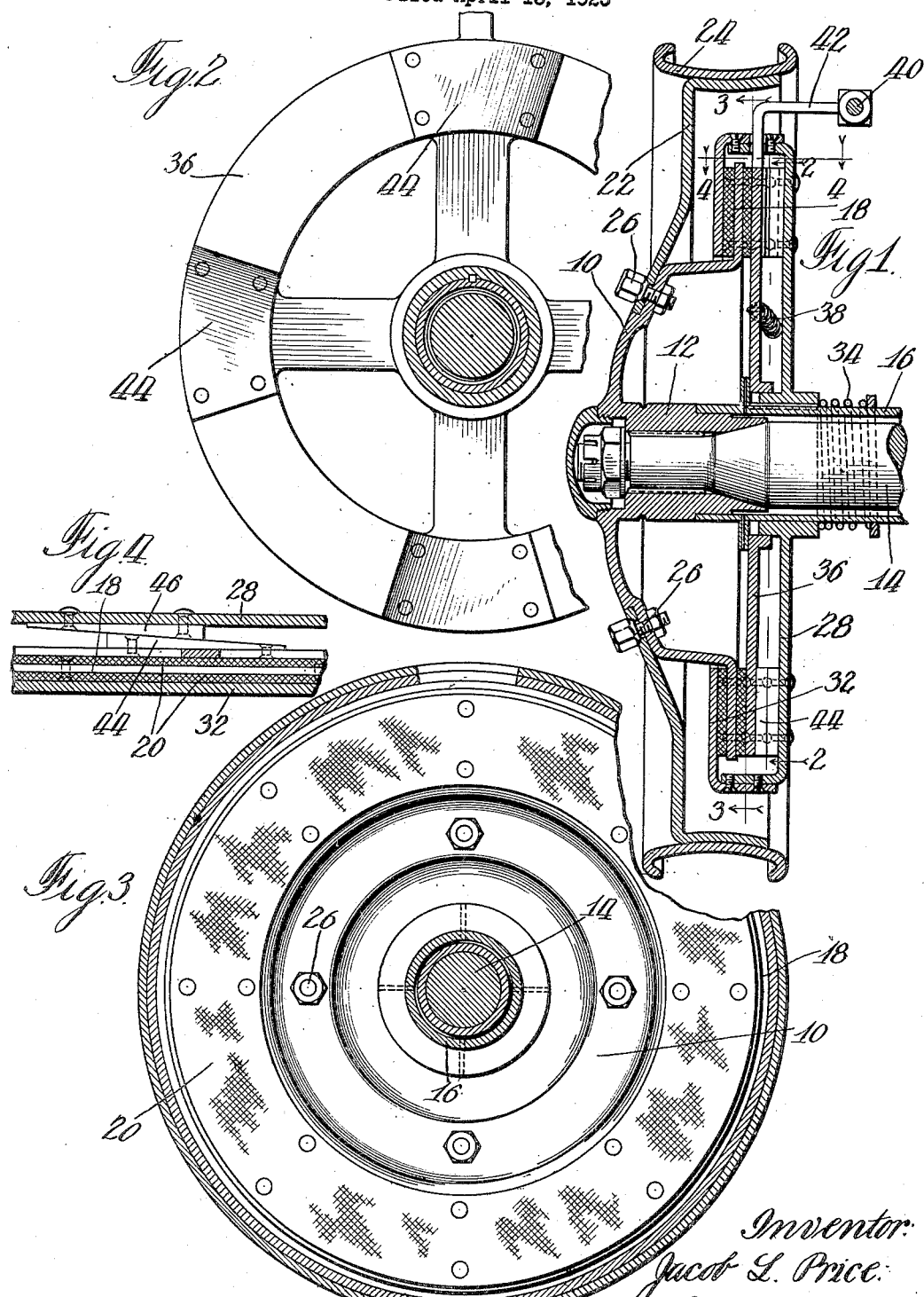
Inventor:  
Jacob L. Price.  
By M. W. McConkey  
Atty.

Patented Nov. 15, 1927.

1,649,185

UNITED STATES PATENT OFFICE.

JACOB L. PRICE, OF CHICAGO, ILLINOIS, ASSIGNOR TO BENDIX BRAKE COMPANY, OF CHICAGO, ILLINOIS, A CORPORATION OF ILLINOIS.

DISK BRAKE.

Application filed April 13, 1925. Serial No. 22,744.

This invention relates to disk brakes, and is illustrated as embodied in an automobile chassis.

One object of the invention is to decrease the cost of the assembly by using one part of the brake, e. g. one of the brake disks, as part of the wheel, by securing thereto, preferably demountably, a tire-carrying annulus forming (with the brake part) the road wheel. The brake part is shown as a rotatably mounted drum-shaped member having a radial flat flange constituting the brake disk.

Other features of the invention relate to the construction and mounting of the non-rotatable parts of the brake, which embody substantial novelty in themselves and in their relation to the above-described wheel, and which will be apparent from the following description of one illustrative embodiment shown in the accompanying drawings, in which:

Fig. 1 is a vertical transverse section through one wheel and brake;

Fig. 2 is a vertical longitudinal section on the line 2—2 of Fig. 1, showing the inner face of one of the non-rotatable disks;

Fig. 3 is a vertical longitudinal section on the line 3—3 of Fig. 1, showing the rotatable disk in side elevation; and Fig. 4 is a horizontal section on the line 4—4 of Fig. 1, showing two of the wedges in top plan.

In the arrangement selected for illustration, one member or disk of the brake is a drum-shaped part 10, integral with or secured to a hub 12 keyed on one live axle 14 of a semi-floating axle having a housing 16, although obviously the device is readily adaptable for use on other types of axles and on front wheels. The outer part of member 10 is in the form of a radial flat flange 18 constituting one disk of the brake, and shown as having the brake lining 2 riveted or otherwise secured to its opposite sides.

The remainder of the wheel is in the form of an annulus 22 secured in any desired manner to a tire-carrying rim 24, and shown as fitting at its inner edge in a rabbeted portion of member 10 and demountably fastened by bolts 26. Thus the brake member 10 and the annulus 22 in effect form a disk wheel.

Loosely keyed on housing 16, so that it may have sufficient universal movement to aline itself with flange 18, is a non-rotatable backing member 28, to which is detachably fastened at its edge by machine screws 30, or by bolts, an overhanging flange 32 engageable with the lining of flange 18 by axial movement of the backing member 28 against the resistance of a spring 34.

This movement may be effected by rocking a disk 36 against the resistance of one or more springs 38 by means of a link 40 connected to an arm 42 projecting through a slot in the overlapping parts of the backing member 28 and the overhanging flange 32. Disk 36 is formed on the left (Fig. 1) for engagement with the brake lining on the right of flange 18, while on its back are secured a series of wedges 44 engaging wedges 46 on the backing member 28. Preferably, in order to guard against unintentional locking of the wheels, the wedges face so that when the vehicle is moving forward, the friction of the brake urges disk 36 backward against the pull of link 40, thus tending to release the brake and guarding against locking by an excessive "servo" action.

While one illustrative embodiment of the invention has been described in detail, it is not my intention to limit its scope to that particular embodiment, or otherwise than by the terms of the appended claims.

I claim:

1. A vehicle wheel comprising, in combination, an axle, a brake member having an annular radial plane surface, retarding means engageable with said surface, and a load-carrying annulus secured to the brake member without obstructing said surface.

2. A vehicle wheel comprising, in combination, an axle, a brake member having an annular radial flange, retarding means engageable with both sides of said flange, and a load-carrying annulus secured to the brake member adjacent the base of the flange.

3. A vehicle wheel comprising, in combination, an axle, a brake supported on the axle and including a plurality of friction brake disks, at least one of which is rotatable about the axis of the axle, and a load-carrying annulus secured to the rotatable brake disk in such a manner that the annulus and brake disk together form a wheel.

4. A wheel comprising inner and outer members together forming a wheel disk, and one of which is provided with a margin projecting on the inside of the wheel and having a radial plane surface forming part of a disk brake.

5. A wheel comprising inner and outer members together forming a wheel disk, and one of which is provided with a margin projecting on the inside of the wheel and having a radial flat flange forming the rotatable member of a disk brake.

6. A wheel comprising, in combination, an inner drum-shaped member having a radial flange at its edge forming the rotatable member of a disk brake, and a load-carrying annulus secured to the member outside of and adjacent the base of the flange.

In testimony whereof I have hereunto signed my name.

JACOB L. PRICE.